May 3, 1960  F. D. BARTO  2,934,827
SCRIBING DEVICE
Filed April 28, 1958
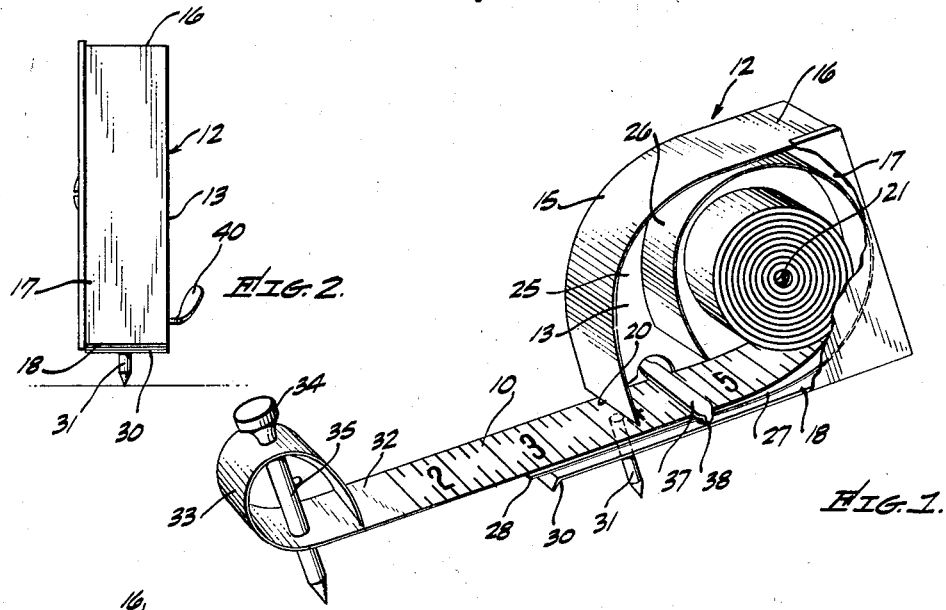
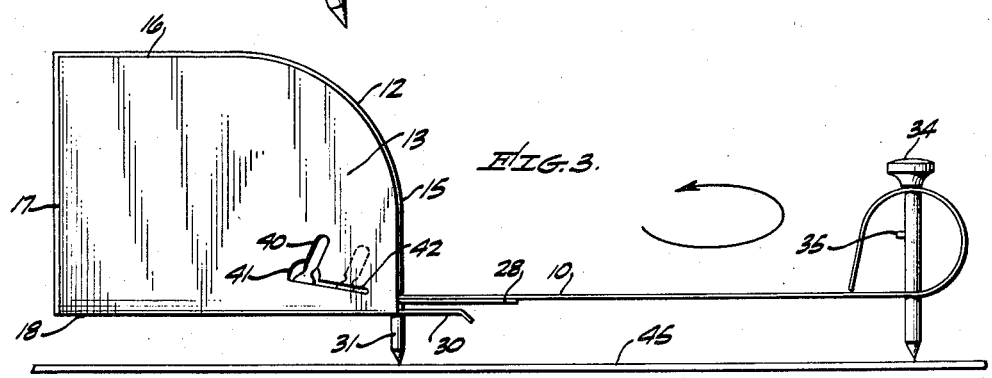
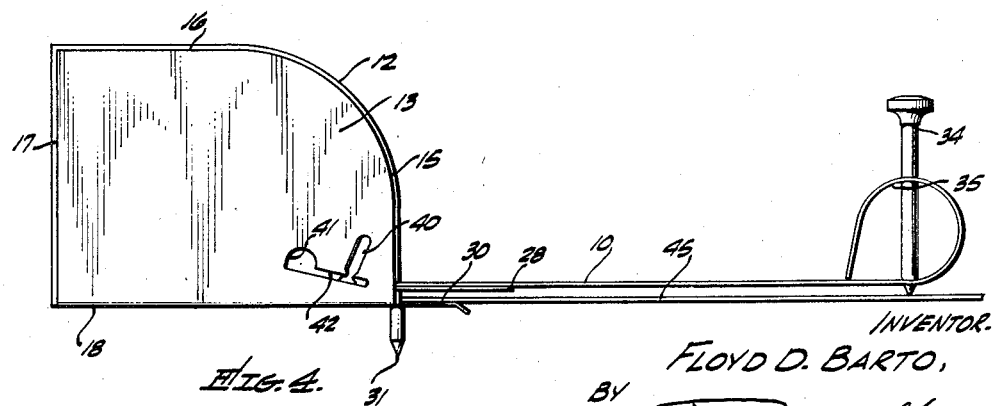
INVENTOR.
FLOYD D. BARTO,
BY David Horn
ATTORNEY.

United States Patent Office 2,934,827
Patented May 3, 1960

2,934,827

SCRIBING DEVICE

Floyd D. Barto, Torrance, Calif.

Application April 28, 1958, Serial No. 731,180

5 Claims. (Cl. 33—27)

This invention relates generally to instruments for drawing or scribing circles or lines, and particularly relates to a marking or scribing device suitable for use with flat pieces of wood, metal and the like.

Various instruments have been devised in the past for drawing or scribing circles or arcs of large radius. To this end it has been proposed to attach in some manner a pair of scribing pins or a pencil to a conventional steel measuring tape. Since such a steel tape may be many feet long circles of correspondingly large radius may be drawn with such an instrument.

Generally the tape of such a device is pulled out to the desired length depending upon the radius of the circle or arc to be drawn. Thereafter the steel tape must be securely locked so that the radius of the circle will not change when the circle is drawn. Prior art circle markers are equipped with a set screw or similar device for locking the measuring tape. However, such set screws are hard to handle when using a circle marker and do not permit locking the tape readily and quickly.

Furthermore, while the beam compasses previously proposed permit drawing of circules they are not adapted to draw or scribe parallel line which is often required in drafting, layout or machine shop work.

It is, accordingly, an object of the present invention to provide a marking or scribing instrument for drawing circles on flat pieces of work such as sheet metal, plywood, cardboard or the like or for scribing parallel lines thereon.

A further object of the invention is to provide an instrument of the character described including a flexible measuring tape and having novel means for selectively releasing and locking the tape in any desired position.

In accordance with the present invention there is provided a novel scribing instrument which includes a conventional flexible measuring tape which is preferably a steel tape. The measuring tape is enclosed by a housing having secured thereto a tape retaining guide which may encircle the tape within the housing. The tape retaining guide extends beyond the housing in a horizontal direction. A second guide member is also secured to the housing and is spaced from and parallel to the retaining guide. Accordingly, a flat piece of work may be received between the two guides so that a scribing pin provided at the the free end of the tape may scribe parallel lines on the work as the work and the instrument are moved relatively to each other along the edge of the work.

Further, in accordance with the invention, there is provided a locking lever for selectively locking or releasing the tape. This locking lever is preferably pivoted on the tape retaining guide and extends through an aperture in the housing. The aperture is inclined with respect to the retaining guide and hence movement of the locking lever will either release the tape or will lock the tape by pressing it against the retaining guide.

It is also feasible to provide the tape housing with a fixed centering pin so that circles or arcs may be drawn by rotating the outer scribing pin on the end of the tape about the centering pin.

These and other objects and advantages of the present invention will become more apparent as the description proceeds, taken in connection with the accompanying drawing, wherein:

Figure 1 is a view in perspective, parts being broken away, of a marking instrument embodying the present invention;

Fig. 2 is a front elevational view of the instrument in Fig. 1;

Fig. 3 is a side elevational view of the instrument of the invention illustrating the instrument when used for scribing circles and;

Fig. 4 is a side elevational view, similar to that of Fig. 3, of the marking instrument when used for scribing parallel lines on a flat piece of work.

Referring now to the drawing and particularly to Figs. 1 and 2, there is illustrated a marking or scribing instrument in accordance with the present invention. The instrument includes a conventional flexible measuring tape 10 which may be a steel tape of slightly concavo-convex cross section to provide rigidity to an extended portion yet permit the tape to be readily rolled up or retracted. The tape 10 may be of any desired length such as 8 feet and preferable is connected to a suitable band of spring steel to permit the tape to be readily retracted into its housing generally indicated at 12. The housing 12 has two side covers 13 and 14. Side cover 13 is preferably integral with or may be secured to a curved front cover portion 15 extending into a straight or horizontal top portion 16, a vertical, straight rear portion 17 and a horizontal, straight bottom portion 18. A slit 20 is provided in the curved front cover portion 15 to permit the tape to extend from the housing 12.

A central spindle 21 extends from the side cover 13. The end portion of the spring steel is secured to the central spindle 21 and the tape itself in its retracted position encircles the spindle 21.

A tape retaining guide generally indicated at 25 is secured to the housing side cover 13. The retaining guide 25 has a loop-shaped portion 26 which generally encircles the tape 10 in its retracted position and then merges into a horizontal portion 27 which is generally parallel to the bottom portion 18 of the housing. An extension 28 of the tape guide 25 extends beyond the cover 12 through the slit 20 and serves a purpose to be described hereinafter.

A work guide 30 is secured to the housing 12 and forms an extension of the bottom portion 18 of the housing. The work guide 30 extends parallel to the tape retaining guide portion 28 and may have a downwardly curved edge as shown. A centering pin 31 is secured to the bottom portion 18 and preferably is in line with the front cover portion 15 which is also used to read off the graduations of the measuring tape 10.

The outer or free end of the tape 10 is provided with a special section 32 which serves the purpose of slidably holding a scriber pin 34. To this end the tape section 32 has a loop 33 having two apertures in registry to receive the scribing pin 34, and to permit it to slide up and down. The scribing pin 34 is provided with a scriber point to scribe lines or arcs on wood, sheet steel and other flat work. Scribing pin 34 may have a nose or projection 35 to limit the movement of the pin and to prevent the pin from slipping through the apertures in the loop 33.

In order to lock the tape in any desired position without the necessity of turning set screws and the like there is provided a locking lever 37. The locking lever 37 is pivoted at 38 to the tape retaining guide portion 27 and extends through the housing cover 13. The locking lever is provided with a broadened end portion 40 to facilitate its movement by the thumb or finger of the operator. The locking lever 37 extends through an aperture in the side cover 13 having a generally circular portion 41 and an inclined narrow portion 42, referring now to Figs. 3 and 4, which is inclined toward the tape retaining guide portion 27. Accordingly, movement of the locking lever toward aperture portion 41 will release the tape and permit the tape to move freely while movement of the lever toward the other extreme of its travel along aperture portion 42 will press the tape against the retaining guide portion 27 to thereby lock the tape in any desired position.

The operation of the invention will now be described by and with reference to all of the figures. Assuming at first that it is desired to mark or scribe a circle or arc on a flat piece of work 45, tape 10 is pulled out to the desired length. The locking lever 37 is pulled to the left of Fig. 3 to release the tape. The tape is preferably graduated in such a manner that the distance read off the tape at the edge of the curved front portion 15 corresponds exactly to the distance between the centering pin 31 and the scribing pin 34. In order to facilitate calibration of the tape the point of the centering pin 31 is preferably in the same plane as the outer surface of the curved front portion 15 from which the tape graduations are read.

When the tape has been pulled out to the desired length, it is locked by pushing the locking lever 37 to the right of Fig. 3. In the manner indicated before the lever 37 will be forced by aperture 42 against tape retaining 37 guide portion 27 thereby pressing the tape against the guide portion which prevents further movement of the tape.

The instrument is now ready to scribe a circle or arc on the work 45. For this purpose pressure is exerted on the top of the scribing pin 34 until it and the centering pin 31 are in the same plane, that is, until they both touch the work 45. Now the scribing pin may be rotated about the centering pin to describe a circle or arc with the desired radius.

Referring particularly to Fig. 4 there will now be described the manner in which parallel lines may be scribed by the instrument. At first the tape is again released and pulled out to the desired length and thereafter locked. The flat work 45 is inserted between the two guides 28 and 30 until the work abuts the lower front of the housing. Furthermore the scribing pin 34 is lifted to permit insertion of the work between the two guides and is thereafter pressed down against the work. It is to be noted that the work is in a different position from that shown in Fig. 3 where the work is underneath the two pins, hence it is essential that scribing pin 34 be able to slide up and down.

When the work is now moved with respect to the instrument, while keeping the edge of the work abutting the housing, a line will be drawn on the work by the pin 34 which is parallel to the edge of the work.

There has thus been disclosed an improved instrument for scribing circles, arcs or parallel lines on flat work. The instrument may also be used for doing triangulation and for transferring points, for example from a drawing to the flat work, with easy and positive stop action of the tape assured. Further, the instrument may be used to scribe lines or points quickly by intersecting arcs.

What is claimed is:

1. A marking or scribing instrument comprising a flexible measuring tape, a housing for said tape substantially enclosing said tape, a slit in said housing permitting passage of said tape through said housing, a first retaining guide member secured to and situated within said housing and extending about said tape, said retaining guide member having a portion extending through said slit and beyond said housing, a second guide member secured to said housing and disposed substantially parallel to said portion of said first retaining guide member, said portion of said first retaining guide member being disposed between the free end of said tape and said second guide member, said guide members being adapted to retain and guide a flat piece of work therebetween, a scribing pin secured to the free end of said tape for scribing lines on the work, and locking means rotatably secured to said first retaining guide member and disposed substantially within said housing for locking said tape against said first retaining guide member.

2. A marking or scribing instrument comprising a flexible metallic measuring tape, a housing for said tape substantially enclosing said tape, a centering pin secured to said housing, a slit in said housing permitting passage of said tape through said housing, a first retaining guide member secured to and disposed within said housing and extending about said tape, said retaining guide member having a portion extending through said slit and beyond said housing, a second guide member secured to said housing and disposed substantially parallel to said portion of said first retaining guide member, said portion of said first retaining guide member being disposed between the free end of said tape and said second guide member, said guide members being adapted to retain and guide a flat piece of work therebetween, a scribing pin secured to the free end of said tape for scribing circles or lines on the work, and locking means pivotably secured to said first retaining guide member and disposed substantially within said housing for locking said tape against said first retaining guide member.

3. A marking or scribing instrument comprising a flexible measuring tape, a housing for said tape substantially enclosing said tape, a slit in said housing permitting passage of said tape through said housing, a first retaining guide member secured to and situated within said housing and disposed about said tape, said retaining guide member having a portion extending through said slit and beyond said housing, a second guide member secured to said housing and disposed substantially parallel to said portion of said first retaining guide member, said guide members being adapted to retain and guide a flat piece of work therebetween, a scribing pin secured to the free end of said tape for scribing lines on the work, and a locking lever having one end pivoted to said retaining guide member within said housing, said housing having an aperture in a side wall thereof opposite the pivoted end of said locking lever, the free end of said locking lever extending through said aperture, said aperture being inclined in a direction toward said tape, whereby movement of said locking lever will either permit said tape to move freely or will lock said tape against said guide member in a desired position.

4. A marking or scribing instrument comprising a measuring tape coiled upon itself in its retracted position, a housing for enclosing said tape in its retracted position, a slit in the front face of said housing for permitting passage of said tape therethrough, a tape retaining guide secured to and disposed within said housing and encircling said tape, said retaining guide having a portion extending through said slit beyond said housing in a plane, a guide member secured to said housing and extending substantially parallel to said portion of said retaining guide, said guide and guide member being spaced apart from each other to receive a flat piece of work therebetween, a scribing pin slidably secured to the free end of said tape for scribing lines on the piece of work, whereby, by inserting the piece of work between said giude member and said guide and moving it relative to said instrument, a line may be drawn on the work by said scribing pin, and a locking lever having one end pivoted to said retaining guide within said housing, said housing having an aperture in a side wall thereof opposite the pivoted end of said locking lever, the free end of said locking lever extending through said aperture, said aperture being inclined in a direction toward said tape, whereby movement of said locking lever will either permit said tape to move freely or will lock said tape against said guide in a desired position.

5. A marking or scribing instrument comprising a measuring tape coiled upon itself in its retracted position, a housing for enclosing said tape in its retracted position, a slit in the front face of said housing for permitting passage of said tape therethrough, a tape retaining guide secured to and disposed within said housing and encircling said tape, said retaining guide having a portion extending through said slit beyond said housing in a plane, a guide member secured to said housing and extending substantially parallel to said portion of said retaining guide, said guide and said guide member being spaced apart from each other to receive a flat piece of work therebetween, a scribing pin slidably secured to the free end of said tape for scribing lines and circles on the piece of work, whereby, by inserting the piece of work between said guide member and said guide and moving it relative to said instrument, a line may be drawn on the work by said scribing pin, a centering pin secured to said housing in a position so that the distance between said pins may be read from said tape, and a locking lever having one end pivoted to said retaining guide within said housing, said housing having an aperture in a side wall thereof opposite the pivoted end of said locking lever, the free end of said locking lever extending through said aperture, said aperture being inclined in a direction toward said tape, whereby movement of said locking lever will either permit said tape to move freely or will lock said tape against said guide in a desired position.

References Cited in the file of this patent

UNITED STATES PATENTS

| | | |
|---|---|---|
| 996,476 | Fitton et al. | June 17, 1911 |
| 2,108,251 | Clark | Feb. 15, 1938 |
| 2,209,250 | Manthey | July 23, 1940 |
| 2,624,120 | Mills | Jan. 6, 1953 |
| 2,651,843 | Goodford | Sept. 15, 1953 |
| 2,679,104 | Whitton | May 25, 1954 |